Nov. 20, 1934.   G. C. BECK   1,980,975
INITIAL CENTERING DEVICE AND METHOD
Filed Aug. 7, 1933
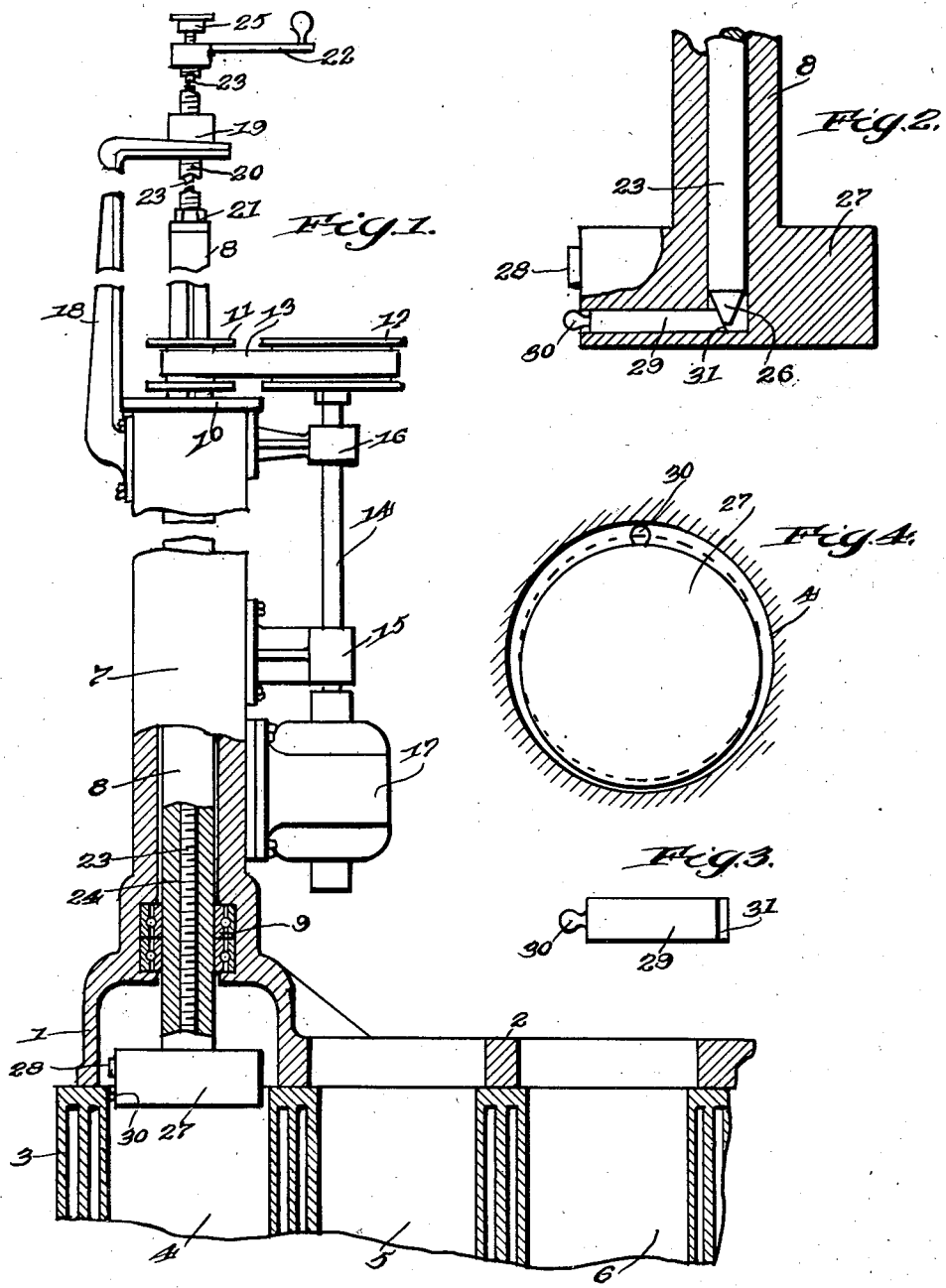
INVENTOR
George C. Beck
BY
Carl H. Crawford
ATTORNEY Registered Nov. 20, 1934

1,980,975

UNITED STATES PATENT OFFICE 1,980,975

INITIAL CENTERING DEVICE AND METHOD

George C. Beck, Spokane, Wash.

Application August 7, 1933, Serial No. 683,952

14 Claims. (Cl. 77—2)

This invention relates to a novel means for accurately centering the head of a high speed cylinder boring machine, and the invention also relates to the method thereof.

It is well known that the rotatable head of a boring machine carries the tool that enlarges the cylinder and before the head can be advanced into the cylinder bore, it is vitally necessary accurately to center the head in the bore, and because of the fact that this invention is especially intended for high speed boring machines, this centering function must be performed with well-nigh precision accuracy.

It is a feature of this invention to provide the rotatable head with initial centering means whereby the head can be accurately centered in the bore to be re-bored before the boring tool enters the cylinder.

It is also a feature of the invention to over-set the initial centering means so that when the head is rotated, the machine will oscillate slightly on the engine block by reason of the eccentric relation of the head to the bore, caused by the over-set of the centering means.

It is also a feature of the invention to provide mechanism for effecting such over-set of the centering means, such mechanism being capable of adjustment to gradually release or otherwise cause the centering means to recede whereby oscillation of the machine will decrease to zero, whereupon the operator will know that the head has been accurately centered and then the machine can be anchored.

The invention has many other features and objects which will be more fully described in connection with the accompanying drawing and which will be more particularly pointed out in and by the appended claims.

In the drawing:—

Fig. 1 is a view partly in elevation and partly in section of a boring machine disposed on an engine block and being equipped with one form of the device of my invention.

Fig. 2 is an enlarged view partly in section, showing the rotatable head and the manner in which the device of the invention is mounted therein.

Fig. 3 is a view of the centering bar detached from the head.

Fig. 4 is a diagrammatic view illustrative of the manner in which the initial centering operation is effected.

Like characters of reference designate similar parts throughout the different figures of the drawing.

The device of this invention is capable of being incorporated into any type of boring machine having a rotatable head that is advanced into and through the bore of a cylinder and hence I have very generally and briefly shown a conventional form of boring machine in which 1, indicates a base having a lateral extension 2 adapted to be anchored to the cylinder block 3, the latter having three cylinders, 4, 5 and 6, illustrated, merely to show the general relation. The machine is provided with a frame which is in the form of an upright sleeve 7, which may be formed integral with the base 1, and in which a vertically disposed driving shaft 8, is journalled, one bearing being designated at 9. Above the top 10, of said sleeve, the shaft 8, is equipped with a pulley 11 which is driven by a pulley 12, through a belt 13. Pulley 12, is mounted on a power shaft 14, journalled in bearings 15 and 16, and driven by a motor 17. Pulley 11 is keyed on shaft 8, to permit the latter to be longitudinally advanced, as is usual in machines of this kind.

A bearing arm 18, fixed to sleeve 7, has a bearing 19, in which an advancing rod is threaded, the rod being indicated at 20, and having a swivelled connection at 21, with shaft 8, to permit the latter to rotate while it is being advanced. A crank 22, fixed to rod 20, serves as a conventional illustration of how rod 20 may be adjusted to advance shaft 8. Disposed internally of shaft 8 and rod 20, is a mechanism, the function of which will be later described. Specifically, however, it consists of an adjusting spindle 23, disposed within shaft 8, and having threaded engagement therewith at 24. For the purposes of this disclosure, the threaded engagement may be so snugly effected as to frictionally hold the spindle in its adjusted position. This spindle is shown extending upwardly through rod 20, and is provided with a head 25, whereby the spindle may be manually adjusted for a purpose to be later described. In Fig. 2, I have shown the actuating end of the spindle coned, as indicated at 26.

On the lower end of shaft 8, is a cutter head 27, having a cutting or boring tool 28, adapted to be set to any extent of projection from the periphery of the head 27, by well known means which is not essential to this invention.

It will now be clear that shaft 8 is rotatably driven by motor 17, and that the head 27 may be advanced into the bore of cylinder 4 by operation of crank 22.

Reference will next be made to that portion of the structure which, in combination with the head 27, constitutes the present invention.

An initial centering means is provided which, in the present construction is in the form of a bar 29 that is radially slidable in the head 27. The outer end 30, may have a suitable spherical terminal form best adapted for engagement with the bore of the cylinder when slightly projected from the head 27, as shown. The actuating end 31 is cammed or inclined for engagement by the cone end 26, of rod 23, whereby the bar 29 may be positively projected or negatively released. Now it will be noted that the knife 28, is disposed some distance above the bar 29, which disposition will permit of the head 27 being advanced into the cylinder just far enough to dispose the bar 29, therein, and not far enough to move the knife 28 therein, the advantage and purpose of which will presently appear.

One manner in which the invention can be caused to function, is as follows:—

The knife 28 is set at the extent of projection necessary for the re-bore the operator desires to make, and of course this is done before the head 27 enters the cylinder. The head 25, is turned to lower the spindle 23 and cause the coned or cammed end 26 to engage the inclined end 31 and project the bar 29 to such an extent that the head 27, will be eccentrically in the bore 4. Then the crank 22, will be turned to lower the shaft 8 and head 27, to the position shown in Fig. 1. It will be understood that the machine has not at this time been anchored to the block.

Before turning on the power, the head 27, is manually rotated a few turns to determine the extent of eccentricity and to prevent a violent jolt or jerking of the machine such as might occur if the power was first turned on. Thus, if the user finds that the bar 29 has been projected so far as needlessly to afford a too great degree of eccentricity, the head 25 can be turned to slightly release bar 29, and allow the latter to retract as a result of its engagement with the bore 4. At this point, an eccentric disposition of the head 27, has been effected.

Now the power is turned on and the machine is run at high speed, which means from two to three hundred revolutions per minute for ordinary size cylinders. By reason of the fact that the head 27, is eccentrically disposed, the machine will oscillate slightly on the block and the operator will then commence to adjust head 25 to gradually release bar 29, which reduces the extent of oscillation of the machine. As this reduction of eccentricity continues, and oscillation decreases, to zero, the operator will then know that the head 27 has been centered to precision accuracy.

When the machine has been accurately centered, as just described, the power will be turned off, and the machine will then be anchored to the engine block. Then the head 25, will be turned to release bar 29 so that the latter cannot and will not function at all throughout the entire boring operation, which involves advancing the head 27 throughout the length of the bore 4, and rotating the head 27 to effect the boring operation, as will now be clear. Hence, it will be seen that my device is essentially a preliminary or initial centering device and that it does not function at all in the boring operation as other well known devices are employed to sustain the head in the truly centered position resulting from the initial use of my invention.

It will thus be seen that the element, shown at 27, is moved or adjusted into an over-set position, relative to the tool-head 27, and into engagement with the wall of the cylinder sufficiently to dispose the tool-head in slight eccentric relation with respect to the bore of the cylinder. The extent of eccentricity can be determined by manually rotating the tool-head and observing the degree to which the loosely mounted machine oscillates. Then the power is turned on to cause continued oscillation of the machine, and the element is gradually adjusted to dispose the tool-head into concentric relation to the cylinder bore, at which time, oscillation of the machine has ceased and the centering operation has been completed.

It will thus be seen that the invention, in one phase, essentially consists in establishing a condition of eccentricity, to cause oscillation of the machine while it is loosely disposed on the block, and then reducing such eccentricity to zero, or in other words, transforming such eccentricity into concentricity.

It will be clear that after the knife has once been set to the re-boring adjustment for the first cylinder of the block, it will not have to again be set for the other cylinders.

In Fig. 4, I have shown in full lines how the bar 29 has been initially projected to dispose the head 27 into eccentric relation to the bore, and in dotted lines, I have shown how this eccentricity has been reduced or transformed into concentricity.

It will now be clear that the elements 27 and 29 constitute a head structure having relatively movable parts for expansion or contraction of said structure while the latter is in eccentric relation to the bore of a cylinder, and that means is provided for gradually expanding or contracting said parts relatively to each other so that such eccentric relation may be gradually transformed into a concentric relation whereby the oscillation of the machine can be reduced to zero to accurately center said head structure in the cylinder bore.

It is believed that the method and apparatus of this invention will be clearly understood from the foregoing description, and while I have herein shown and described one specific form of the invention, I do not wish to be limited thereto except for such limitations as the claims may import.

I claim:—

1. In a method of centralizing a boring machine on a cylinder, the steps of loosely supporting the machine on the cylinder with the boring tool-head in eccentric relation thereto, projecting an element from the boring tool-head on a radius greater than that of the cylinder, rotating the tool-head thereby producing oscillatory motion of the machine, and gradually reducing the radius of the element until the oscillatory motion ceases.

2. In a method of centralizing a boring machine on a cylinder, the steps of loosely supporting the machine on the cylinder with the boring tool-head in eccentric relation thereto, advancing the tool-head partially into the cylinder, projecting an element from the boring tool-head on a radius greater than that of the cylinder for contact with the wall of the latter, rotating the tool-head thereby producing oscillatory motion of the machine, and gradually reducing the radius of the element until the oscillatory motion ceases.

3. In a method of centralizing a boring machine on a cylinder, the steps of loosely supporting the machine on the cylinder with the boring tool-head in eccentric relation thereto, advancing the tool-head partially into the cylinder, projecting an element from the tool-head on a radius greater than that of the cylinder for contact with the wall of the latter, rotating the tool-head thereby producing oscillatory motion of the machine, gradually reducing the radius of the element until the oscillatory motion ceases, and thereafter securing the machine in place.

4. In a method of centralizing a boring machine on a cylinder, the steps of loosely supporting the machine on the cylinder with the boring tool-head in eccentric relation thereto, advancing the tool-head partially into the cylinder, projecting an element from the tool-head on a radius greater than that of a cylinder for contact with the wall of the latter, rotating the tool-head thereby producing oscillatory motion of the machine, gradually reducing the radius of the element until the oscillatory motion ceases, securing the machine in place on the cylinder, and thereafter advancing the tool-head into boring relation to the cylinder.

5. In a centering means for cylinder boring machines, the combination with a power driven cutter head having a boring tool, of a movable centering member carried by said head, mechanism for engaging said member with the cylinder wall to throw said head into eccentric relation with the latter and to thereby cause an oscillatory motion to be imparted to the machine, and means for adjusting said mechanism to gradually change the relative position of said member to reduce the oscillatory motion of the machine to zero and thereby center the head in the cylinder bore with precision accuracy.

6. In a centering means for cylinder boring machines, the combination with a power driven rotary cutter head having a boring tool, of a radially movable centering member carried by said head, mechanism for engaging said member with the cylinder wall to throw said head into eccentric relation with the latter and to thereby cause an oscillatory motion to be imparted to the machine, and means for adjusting said mechanism to gradually change the relative position of said member to reduce the oscillatory motion of the machine to zero and thereby center the head in the cylinder bore with precision accuracy.

7. In a centering means for cylinder boring machines, the combination with a power driven rotary cutter head having a boring tool, of a radially movable centering member carried by said head, mechanism for engaging said member with the cylinder wall to throw said head into eccentric relation with the latter and to thereby cause an oscillatory motion to be imparted to the machine, and means operable during oscillatory movement of the machine for manually adjusting said mechanism to gradually change the relative position of said member to reduce the oscillatory motion of the machine to zero and thereby center the head in the cylinder bore with precision accuracy.

8. In a centering means for cylinder boring machines, the combination with a power driven rotary cutter head having a boring tool, of a centering member carried by said head sufficiently in advance of said tool to be disposed inside the cylinder with the tool outside thereof, means for advancing said head to dispose said member into said cylinder with said head in lost motion relation to the cylinder bore whereby rotation of said head will impart oscillatory motion to the machine, mechanism adapted to actuate said member, and means for adjusting said mechanism to gradually move said member into engagement with the wall of the cylinder and reduce oscillatory motion of the machine to zero and thereby center the head in the cylinder bore with precision accuracy.

9. In a centering means for cylinder boring machines, the combination with a power driven shaft provided with a cutter head having a boring tool, of a movable centering bar radially slidable in said head and having an outer end for engagement with the cylinder bore, a bar actuating spindle longitudinally adjustable in said shaft for engaging the inner end of said bar to project the latter against the cylinder wall and throw said head into eccentric relation with the latter to thereby cause an oscillatory motion to be imparted to the machine, and said spindle having means whereby it may be gradually adjusted to release said bar and reduce oscillation of the machine to zero and thereby center the head in the cylinder bore with precision accuracy.

10. In a centering means for cylinder boring machines, the combination with a rotary shaft provided with a cutter head having a boring tool, a centering bar radially slidable in said head and having an outer end for engagement with the cylinder bore, a bar actuating and releasing spindle in threaded engagement with said shaft and having cam engagement with said bar to project the latter into engagement with the bore and throw said head into eccentric relation therewith to impart oscillating motion to the machine, and said spindle having means whereby the latter may be adjusted to gradually release said bar and reduce oscillation of the machine to zero while said head is rotating and thereby center said head in the cylinder with precision accuracy.

11. In a centering means for cylinder boring machines, the combination with a vertically disposed power driven rotary shaft provided with a cutter head and a bore in said shaft extending into said head and said head having a horizontally and radially disposed bar guiding bore intersecting the bore in said shaft, a boring tool for said cutter head, a centering bar slidable in said bar guiding bore of said head and having an outer end for engagement with the bore of the cylinder and an inner cam end, a bar actuating and releasing spindle longitudinally adjustable in the bore of said shaft and having a cam end for engagement with the cam end of said bar to project said bar against said bore and throw said head into eccentric relation with said bore to impart oscillating motion to the machine, and said spindle having means for manually adjusting said spindle to gradually release said bar during rotation of said head and reduce oscillation of the machine to zero and thereby center said head in the cylinder with precision accuracy.

12. In a method of centering a boring machine on a cylinder, the steps of loosely supporting the machine on the cylinder with the boring tool-head disposed in the cylinder, moving an element relative to the tool-head into contact with the cylinder wall sufficiently into an over-set adjustment to dispose the tool-head in eccentric relation to the cylinder, rotating the tool-head thereby causing oscillatory motion of the machine, and gradually adjusting said element to dispose the tool-head in concentric relation to the cylinder and cause oscillatory motion to cease.

13. In a method of centering a boring machine on a cylinder, the steps of loosely supporting the machine on the cylinder with the boring tool-head therein, adjusting an element relative to the tool-head into a position greater than the radius of the cylinder and into engagement with the wall thereof to dispose said tool-head in eccentric relation in the cylinder, rotating the tool-head thereby causing oscillatory movement of the machine, and gradually adjusting the element to dispose the tool-head in concentric relation to the cylinder and cause oscillatory motion to cease.

14. In a method of centering a power driven boring machine on a cylinder, the steps of loosely supporting the machine on the cylinder with the boring tool-head disposed therein, adjusting an element relative to the tool-head and into engagement with the wall of the cylinder sufficiently to dispose the tool-head in slight eccentric relation thereto, manually rotating the tool-head to oscillate the machine and thereby determine the extent of eccentricity of the tool-head, then turning on the power to rotate the tool-head and cause oscillatory motion of the machine, and adjusting the element to gradually dispose the tool-head into concentric relation to the bore of the cylinder and cause oscillatory motion to cease.

GEORGE C. BECK.